United States Patent [19]

Oldford

[11] Patent Number: 5,791,269

[45] Date of Patent: Aug. 11, 1998

[54] TREE TRANSPLANTER WITH DETACHABLE PAIRS OF BLADES

[76] Inventor: David Oldford, P.O. Box 22, Blackfalds, Alberta, Canada, T0M 0J0

[21] Appl. No.: 679,345

[22] Filed: Jul. 11, 1996

[51] Int. Cl.[6] .................................................. A01C 11/00
[52] U.S. Cl. ........................ 111/100; 111/114; 111/919; 47/76
[58] Field of Search ............................ 111/100, 106, 111/101, 114, 200, 900, 919; 294/50.7, 50.8; 37/302; 171/5, 50, 55, 59, 103; 42/73, 76, 78, 66.1, 65.5, 66.3

[56] References Cited

U.S. PATENT DOCUMENTS

| | | | |
|---|---|---|---|
| D. 226,279 | 2/1973 | Eyerly | 47/73 X |
| 357,197 | 2/1887 | Harsin | 47/76 |
| 551,421 | 12/1895 | Walter | 111/106 |
| 594,668 | 11/1897 | Wilkens . | |
| 2,313,604 | 3/1943 | Vogel | 47/37 |
| 2,740,234 | 4/1956 | Van Norman | 47/37 |
| 3,017,719 | 1/1962 | Sigler et al. | 47/76 X |
| 3,032,368 | 5/1962 | Sigler et al. | 47/76 X |
| 3,161,989 | 12/1964 | Sigler et al. | 47/76 |
| 3,319,988 | 5/1967 | Smith | 111/106 X |
| 3,460,277 | 8/1969 | Grover et al. | 37/2 |
| 3,782,773 | 1/1974 | Mason | 47/76 X |
| 4,325,202 | 4/1982 | Liard | 47/73 |
| 4,454,683 | 6/1984 | Schauer et al. | 47/76 |
| 4,539,920 | 9/1985 | Dufrene | 111/106 |
| 4,604,017 | 8/1986 | Boehm | 47/76 X |
| 5,081,941 | 1/1992 | Weeks | 111/101 |
| 5,156,101 | 10/1992 | Wien | 111/106 X |
| 5,359,809 | 11/1994 | Johnson | 47/73 |
| 5,561,947 | 10/1996 | Greenarch et al. | 47/73 X |

FOREIGN PATENT DOCUMENTS

405153877 A  6/1993  Japan ...................... 111/114

Primary Examiner—Terry Lee Melius
Assistant Examiner—Victor Batson
Attorney, Agent, or Firm—Anthony R. Lambert

[57] ABSTRACT

A conical tree transplanter is formed of first and second pairs of opposed tapered blades loosely connected sequentially side by side to form a cone having a narrow end and a wide end. The first pair of opposed tapered blades is removable from the second pair of opposed tapered blades by movement in the direction from the narrow end towards the wide end of the cone and is supported by the second pair of opposed tapered blades against movement from the wide end to the narrow end of the cone. A connector is located on each of the tapered blades at the wide end of the cone for connection to a lifting apparatus.

11 Claims, 7 Drawing Sheets

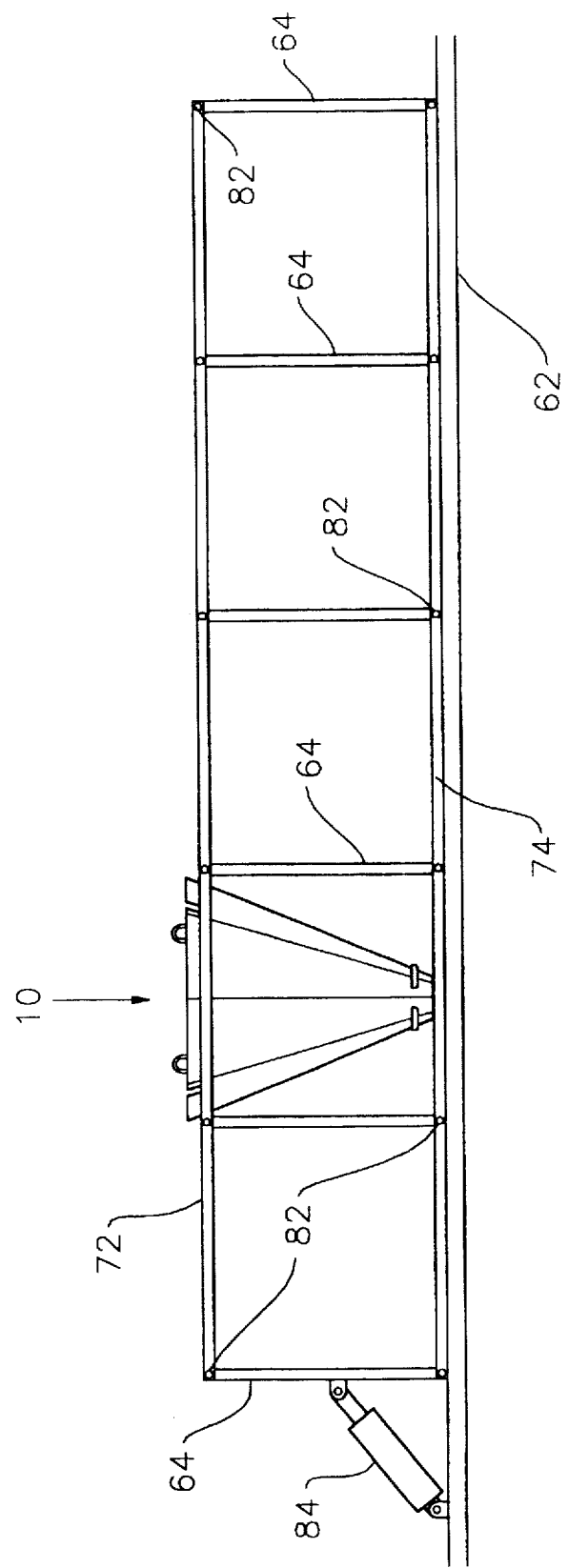

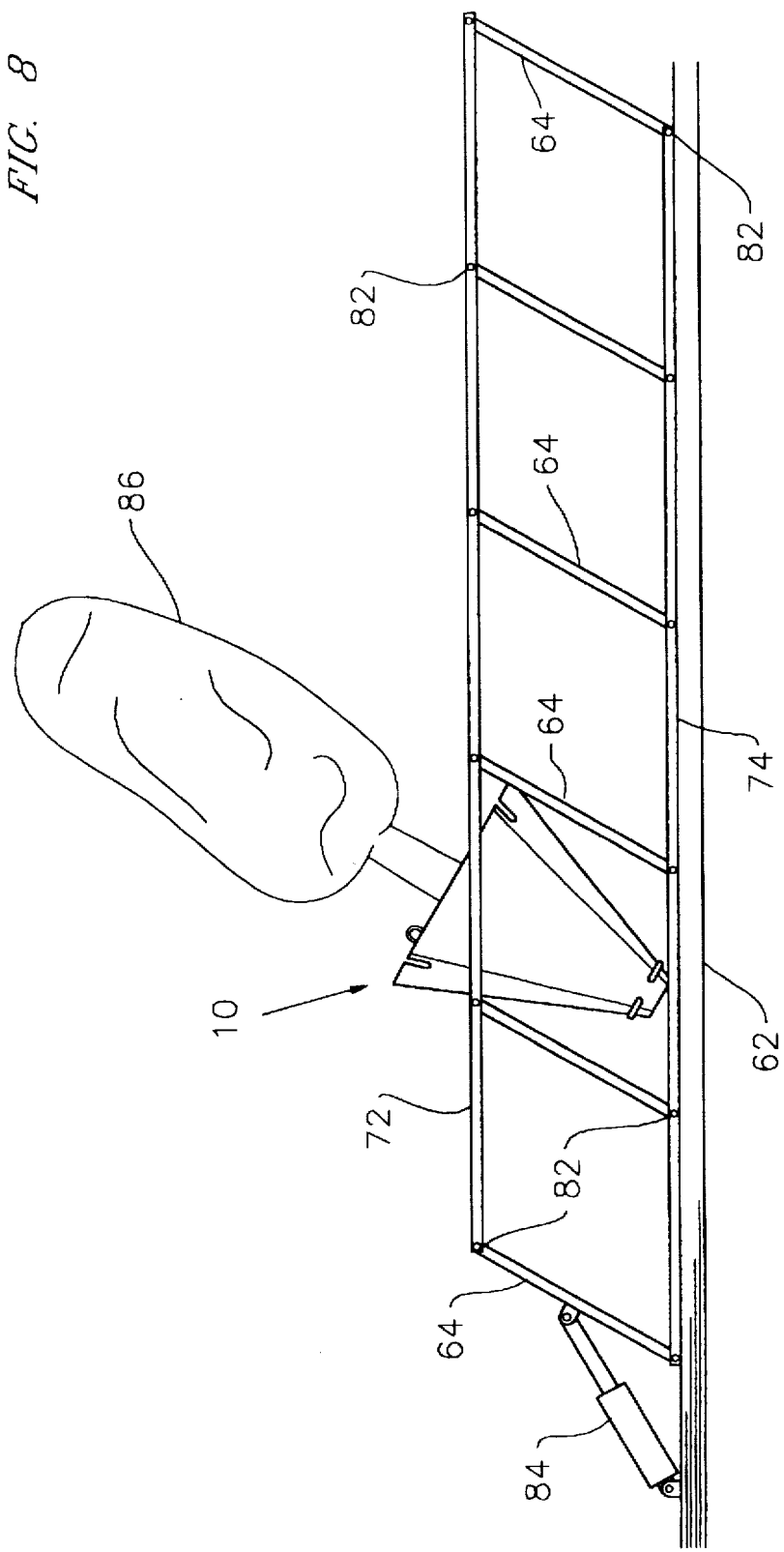

TREE TRANSPLANTER WITH DETACHABLE PAIRS OF BLADES

FIELD OF THE INVENTION

This invention relates to tree transplanters.

BACKGROUND AND SUMMARY OF THE INVENTION

In the art of removing trees, it was previously known to use a tree spade to dig out a tree, load the tree root ball into a basket, and carry the tree root ball to another site in the basket. The basket and tree are then deposited in a prepared hole. The basket is left in the ground.

The inventor has identified that this process is expensive in that a tree basket must be used for each tree.

The inventor thus proposes a tree transplanter and method of transplanting trees that does not result in using a tree basket for each tree transplanted.

Therefore, according to one aspect of the invention, a conical tree transplanter is formed of first and second pairs of opposed tapered blades loosely connected sequentially side by side to form a cone having a narrow end and a wide end. The first pair of opposed tapered blades is removable from the second pair of opposed tapered blades by movement in the direction from the narrow end towards the wide end of the cone and is supported by the second pair of opposed tapered blades against movement from the wide end to the narrow end of the cone. A connector is located on each of the tapered blades at the wide end of the cone for connection to a lifting apparatus.

In a further aspect of the invention, a method of transplanting trees is provided, including:

- locating the tree in the conical tree transplanter with the opposed tapered blades loosely connected sequentially side by side to form an inverted cone having a narrow end and a wide end;
- lifting the tree from the ground by lifting the second pair of opposed tapered blades, with the second pair of opposed tapered blades supporting the first pair of opposed tapered blades;
- carrying the tree to the second location;
- placing the conical tree transplanter and tree in a previously dug hole at the second location;
- lifting the first pair of opposed tapered blades from the ground; and
- lifting the second pair of opposed tapered blades from the ground, leaving the tree in the previously dug hole.

These and other aspects of the invention are described in the detailed description of the invention and claimed in the claims that follow.

BRIEF DESCRIPTION OF THE DRAWINGS

There will now be described preferred embodiments of the invention, with reference to the drawings, by way of illustration, in which like numerals denote like elements and in which:

FIG. 7 is a side view of the tree transplanters of FIG. 6; and

FIG. 8 is a second side view of the tree transplanters of FIG. 7, with a slanted carrying system.

DETAILED DESCRIPTION OF PREFERRED EMBODIMENTS

Figure 1:
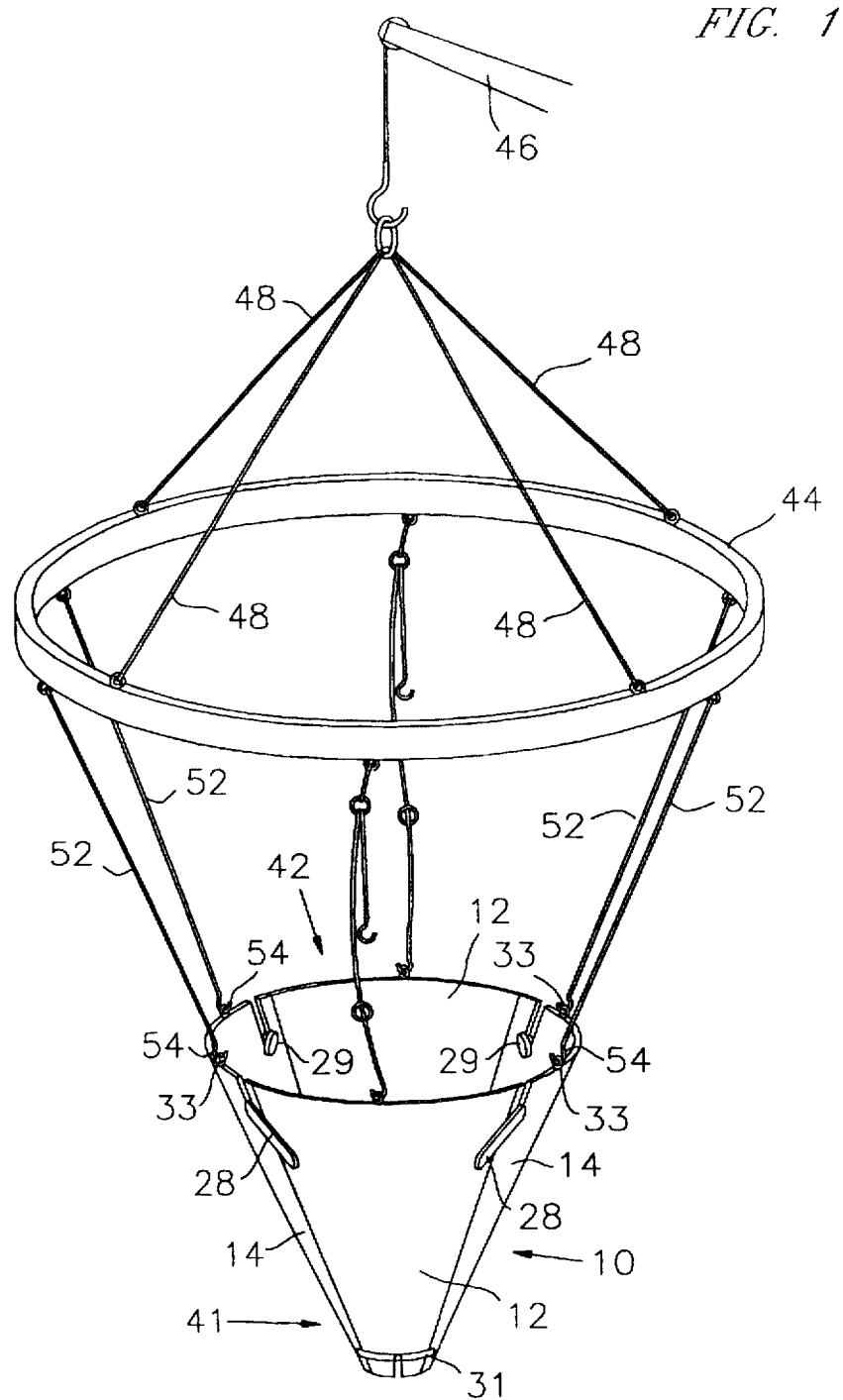
FIG. 1 is a perspective view of an embodiment of the invention including conical tree transplanter and lifting mechanism, with the conical tree transplanter in the tree lifting position.
Figure 2A:
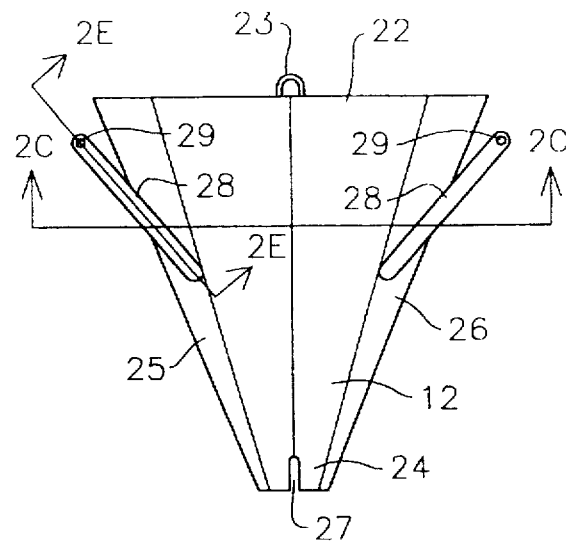
FIGS. 2A and 2B are side elevation views of blades used with the tree transplanter shown in FIG. 1.
Figure 2B:
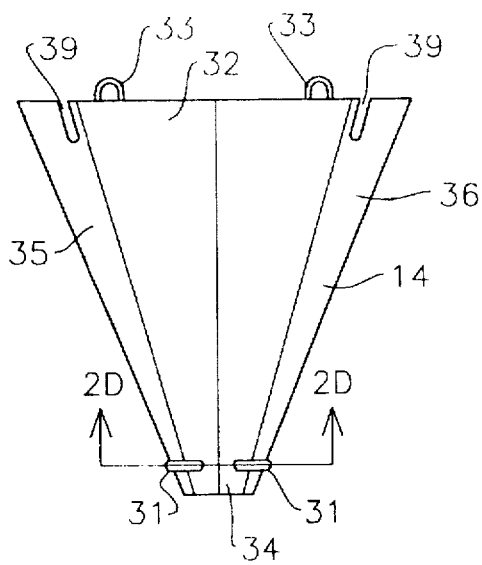

Referring to FIG. 1, a tree transplanter 10 is formed of two pairs of opposed tapered blades 12 and 14. Each tapered blade 12 of the first pair is constructed as shown in FIG. 2A. Each tapered blade 14 of the second pair is constructed as shown in FIG. 2B.

Blade 12 has a wide end 22, a narrow end 24 and first and second sides 25 and 26. Likewise, blade 14 has a wide end 32, a narrow end 34 and first and second sides 35 and 36. Blades 12 each have a hook or eye or other connector 23 roughly centered at the wide end 22. Blades 14 each have two eyelets 33 or other connector at either side of the wide end 32.

Figure 2C:
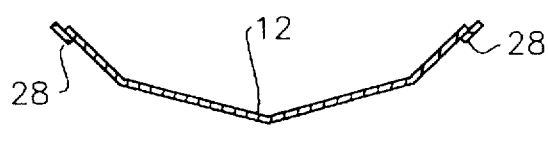
FIGS. 2C, 2D and 2E are cross-sections through the blades shown in FIGS. 2A and 2B respectively along the lines 2C—2C, 2D—2D and 2E'2E.
Figure 2D:
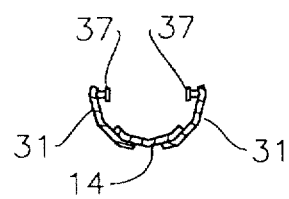
Figure 2E:
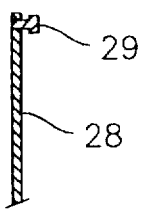
Figure 4:
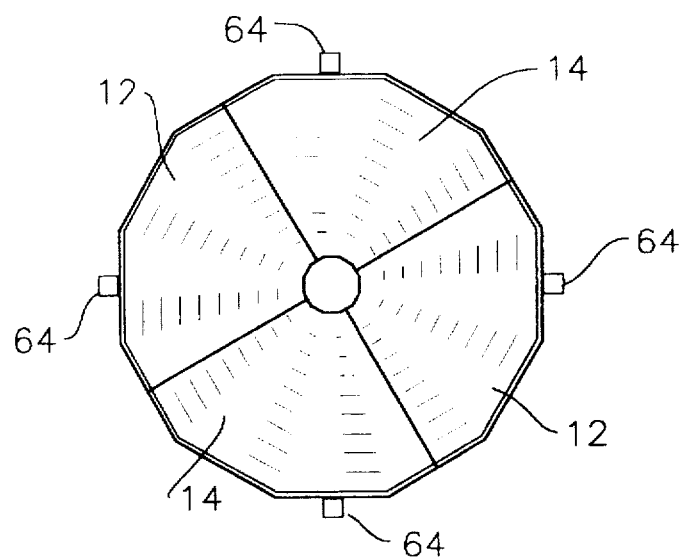
FIG. 4 is a top plan view of the conical tree transplanter of FIG. 3.
Figure 5:
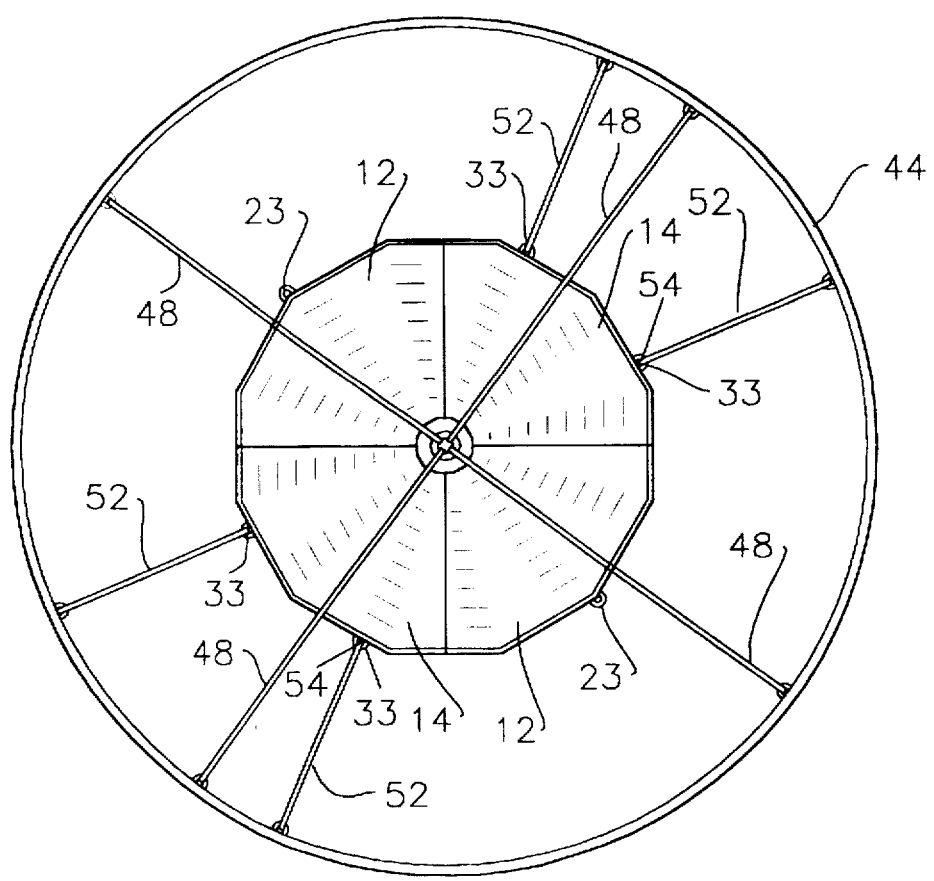
FIG. 5 is a top plan view of the conical tree transplanter with lifting mechanism as shown in FIG. 1.

Each blade 12, 14 has a thin tapered edge at the narrow end 24, 34 for ease of insertion into soil. The blades 12 and 14 are thin in the direction perpendicular to the plane of FIGS. 2A and 2B as shown in FIGS. 2C and 2D. The thinner the blades 12 and 14 the better, but with the limitation that they must be thick enough to support the weight of a tree ball in the conical container the blades form when connected together. Each blade 12, 14 curves approximately 90° in a plane perpendicular to a line connected the wide and narrow ends of the blades. Hence, four blades 12, 14 approximate a circle in cross-section. While the blades 12, 14 may be actually smoothly curved, they may also be made of angled sections as shown in FIGS. 2C and 2D. Thus, each blade 12, 14 is formed of outer segments subtending a 15° arc at each side 25, 26 and 35, 36, and inner segments subtending a 30° arc between the outer segments. Adjacent side segments of the blades 12, 14 when they are arranged sequentially side by side thus subtend a 30° arc, and altogether the conical tree transplanter in section appears as a regular dodecagon (as seen in FIGS. 4 and 5).

Each tapered blade 12 has a slot 27 at the narrow end 24 of the tapered blade 12 for receiving a pin 37 of an adjacent tapered blade 14. Each tapered blade 12 also has an extension arm 28 on each side 25, 26 at the wide end 22 of the tapered blade 12, with each extension arm 28 terminating in a pin 29 extending transversely from the extension arm 28. Each pin 29 is received, in operation, by a slot 39 of an adjacent tapered blade 14. The extension arms 28 are each flat bars welded to the blades 12. Each pin 29 has a shank that may be welded or screwed into an opening in an extension arm and a head whose diameter is greater than the width of the slot 39.

Each tapered blade 14 has a slot 39 on each side 35, 36 at the wide end 32 of the tapered blade 14, with the slots 39 opening away from the narrow end 34. Also, each tapered blade 14 has an extension arm 31 at the narrow end 34 on each side 35, 36, with each extension arm 31 terminating in a pin 37 extending transversely to the extension arm 31. The extension arms 31 are each flat bars welded to the blades 14 and bent into an arc to follow the curvature of the conical tree transplanter 10 at the narrow end 41. Each pin 37 has a shank that may be welded or screwed into an opening in an extension arm and a head whose diameter is greater than the width of the slot 27. The heads of the pins 29, 37 must be sufficiently spaced from the arms 28 and 31 to allow for the thickness of the blades 14 and 12 respectively.

When four tapered blades 12 and 14, two of each type, are placed adjacent each other in a circle, with pins of one blade in slots of another, and with the blades 12, 14 alternating, they are loosely connected sequentially side by side to form a conical tree transplanter 10 having a narrow end 41 and a wide end 42. Thus, pins 29 are received by slots 39, and pins 37 are received by slots 27.

With the slot and pin arrangement thus described, and four tapered blades altogether, the tapered blades 12 form a pair of opposed tapered blades that may be supported by the blades 14 or removed from them by selection of the lifting position of the blades. If the blades 14 are lifted with a lifting mechanism, as for example at the connectors 33, as shown in FIG. 1, the blades 12 are supported by the blades 14 against movement from the wide end 41 to the narrow end 42 of the conical tree transplanter 10. A lifting device is shown in FIGS. 1 and 5 and includes a ring 44 suspended from a crane arm 46 by cables 48. Flexible connecting links 52, such as cables or chains, are connected by hooks 54 to the connectors 33. Pulling upward on the connectors 33 pulls up on the blades 14. The blades 12 are supported by the blades 14 with pins 37, 29 respectively sitting in slots 27, 39. Pins 29 are pulled downward by gravity into slots 39, while pins 37 are pulled up into the slots 27 by the lifting mechanism.

Figure 1A:
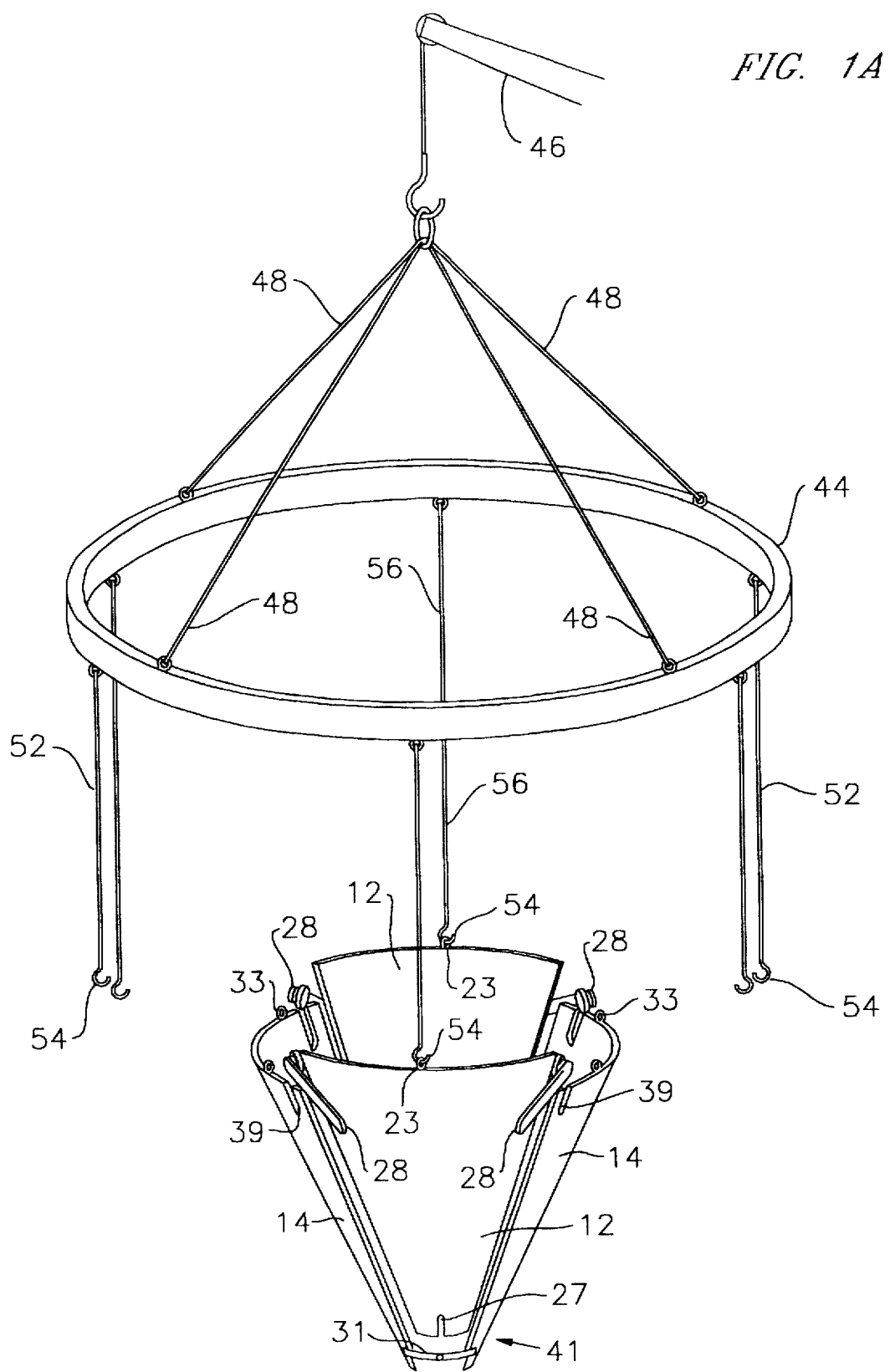
FIG. 1A is a perspective view of the conical tree transplanter of FIG. 1 showing the lifting mechanism connected to lift one pair of opposed blades away from the other pair of opposed blades.

As shown in FIG. 1A, the blades 12 are removable from the tapered blades 14 by connecting flexible connecting elements 56, such as a chain or cable, between the ring 44 and the connectors 23 and lifting upward with the crane arm 46. Movement of the blades 12 in the direction from the narrow end 41 towards the wide end 42 of the conical tree transplanter 10 detaches the blades 12 from the blades 14.

Figure 3:
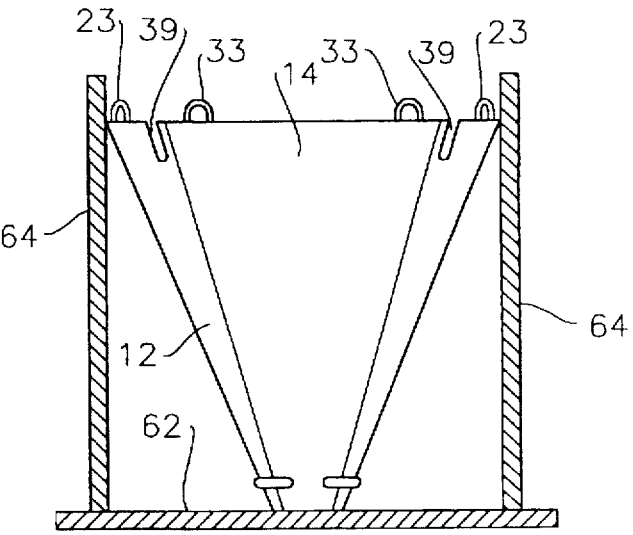
FIG. 3 is a side elevation view of a conical tree transplanter according to the invention supported by carrier supports.

In operation, at the location from which the trees are to be removed, it is preferred to create an additional hole or holes to temporarily store the trees. The holes are preferably conical and are created with a tree spade. A conical tree transplanter 10 formed of blades 12 and 14 is located in each hole. A tree spade (not shown, but well known in the art) is used to dig out a tree and load its tree root ball into one of the conical tree transplanters. The ring 44 is then connected by the connecting links 52 to the blades 14. A crane, or front end loader, or other piece of equipment that can lift heavy objects, is used to lift the ring 44, conical tree transplanter 10 and tree root ball, and deposit it on a truck bed 62 between supports 64, seen in FIGS. 3 and 4. The supports 64 support the conical tree transplanter 10 and tree root ball against falling over. The ring 44 is then removed from the conical tree transplanter 10. Numerous such conical tree transplanters can be used on one truck bed to transplant several trees at the same time as shown in FIG. 6.

Figure 6:
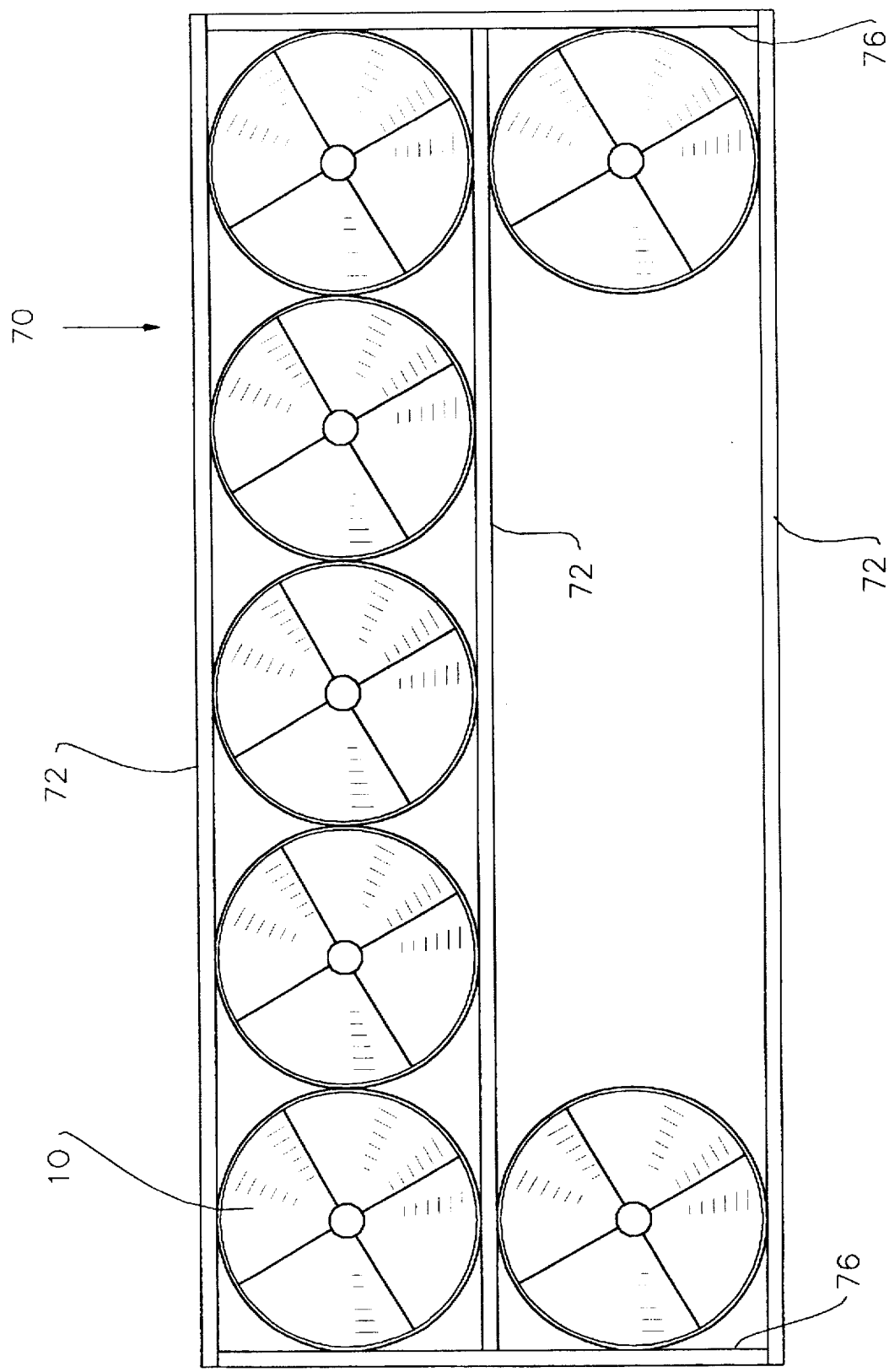
FIG. 6 is a top view of several tree transplanters according to the invention mounted on a truck bed.

The tree transplanters 10 are supported in a rack 70 shown in FIG. 6, 7 and 8. The rack 70 is made of parallel upper side rails 72 and parallel lower side rails 74, connected at their respective ends by end rails 76 (the lower end rails are not shown, but are similar to the upper end rails 76 shown). The side rails 72, 74 are pivotally bolted by bolts 82 to supports 64 interconnecting the upper and lower side rails 72, 74 to permit the side rails to move relative to each other while staying parallel. The side rails 72, 74, end rails 76 and supports 64 may all be made of channel irons. One end of the rack 70 is connected a hydraulic ram 84. For insertion of the tree transplanter into one of wells formed by four adjacent supports 64, the supports 64 are preferably held upright (perpendicular to the bed of the vehicle). After insertion of a desired number of tree transplanters 10 and trees 86, the hydraulic ram 84 is activated to displace the upper side rails 72 in relation to the lower side rails 74 and thus tilt the supports 64 into the tilted position shown in FIG. 8. This is the preferred tree carrying position, with the tree 86 pointing forward.

Upon arriving at a second location, the supports 64 are returned to the upright position by the hydraulic ram 84. For removal of the trees from the rack 70, the conical tree transplanter 10 and tree root ball are lifted in the same manner as shown in FIG. 1 and carried to a previously dug hole in which the tree is to be planted. Preferably, the new hole will have an approximately conical shape. The flexible connecting elements 52 are then detached from the connectors 33, and flexible connecting elements 56 attached to connectors 23. Upon lifting with the crane arm 46 or similar lifting device, the blades 12 can be pulled up and away from the blades 14 and out of the hole in which the tree has been transplanted. Then the blades 14 can be easily removed from the hole, leaving the tree root ball in the hole.

A person skilled in the art could make immaterial modifications to the invention described and claimed in this patent without departing from the essence of the invention.

The embodiments of the invention in which an exclusive property or privilege is claimed are defined as follows:

1. A tree transplanter comprising;

first and second pairs of opposed tapered blades loosely connected sequentially side by side to form a cone having a narrow end and a wide end;

the first pair of opposed tapered blades being removable from the second pair of opposed tapered blades by movement in the direction from the narrow end towards the wide end of the cone and being supported by the second pair of opposed tapered blades against movement from the wide end to the narrow end of the cone;

the second air of opposed tapered blades being held in position by the first pair of opposed tapered blades when the first pair of opposed tapered blades is supported by the second pair of opposed tapered holes;

the blades of the second pair of the opposed tapered blades becoming separable from one another when the first pair of opposed tapered blades is removed from the second pair of opposed tapered blades; and a connector on each of the tapered blades at the wide end of the connector connection to a lifting apparatus.

2. The tree transplanter of claim 1 in which the lifting apparatus includes:

a ring;

means for connecting the ring to lifting equipment; and flexible connecting elements secured to the ring, the flexible connecting elements being attachable and detachable to the connectors on the opposed tapered blades.

3. The tree transplanter of claim 2 in which the connectors are lifting eyes, and the flexible connecting elements terminate in hooks.

4. The tree transplanter of claim 3 in which each tapered blade has a wide end and a narrow end and first and second sides and:

each tapered blade of the second pair of opposed tapered blades has a slot on each of the first and second sides at the wide end of the tapered blade, with the slots opening away from the narrow end, and an extension arm at the narrow end of the tapered blade, with the extension arm terminating in a pin; and each tapered blade of the first pair of opposed tapered blades has a slot at the narrow end of the tapered blade for receiving pins of adjacent tapered blades of the second pair of opposed tapered blades, and an extension arm on each of the first and second sides at the wide end of the tapered blade, with each extension arm terminating in a pin received, in operation, by a slot of an adjacent tapered blade of the second pair of opposed tapered blades.

5. The tree transplanter of claim 1 in which each tapered blade has a wide end and a narrow end and first and second sides and:

each tapered blade of the second pair of opposed tapered blades has a slot on each of the first and second sides at the wide end of the tapered blade, with the slots opening away from the narrow end, and an extension arm at the narrow end of the tapered blade, with the extension arm terminating in a pin; and each tapered blade of the first pair of opposed tapered blades has a slot at the narrow end of the tapered blade for receiving pins of adjacent tapered blades of the second pair of opposed tapered blades, and an extension arm on each of the first and second sides at the wide end of the tapered blade, with each extension arm terminating in a pin received, in operation, by a slot of an adjacent tapered blade of the second pair of opposed tapered blades.

6. A method of transplanting a tree from a first location to a second location, using a conical tree transplanter formed of first and second pairs of opposed tapered blades, wherein the tree is growing from a tree root ball, the method comprising the steps of:

locating the tree root ball in the conical tree transplanter with the opposed tapered blades loosely connected sequentially side by side to form an inverted cone having a narrow end and a wide end;

lifting the tree from the ground by lifting the second pair of opposed tapered blades, with the second pair of opposed tapered blades supporting the first pair of opposed tapered blades;

carrying the tree to the second location;

placing the conical tree transplanter and tree root ball in a previously dug hole at the second location;

lifting the first pair of opposed tapered blades from the ground, an thereby separating the second pair of opposed tapered blades from each other; and after lifting the first pair of opposed tapered blades from the ground, lifting the second pair of opposed tapered blades from the ground, leaving the tree root ball in the hole.

7. The method of claim 6 in which the conical tree transplanter includes connectors on each tapered blade of the second pair of opposed tapered blades, and carrying the tree to the second location includes:

suspending the conical tree transplanter from a ring with flexible connecting elements linking the connectors and the support;

carrying the conical tree transplanter to a vehicle; and placing the conical tree transplanter in a support on a vehicle.

8. A tree transplanter, comprising:

first and second pairs of opposed tapered blades loosely connected sequentially side by side to form a cone having a narrow end and a wide end;

the first pair of opposed tapered blades being removable from the second pair of opposed tapered blades by movement in the direction from the narrow end towards the wide end of the cone and being supported by the second pair of opposed tapered blades against movement from the wide end to the narrow end of the cone;

a lifting apparatus having a ring, means for connecting the ring to lifting equipment and flexible connecting elements secured to the ring; and a connector on each of the tapered blades at the wide end of the cone for connection to the flexible connecting elements, the flexible connecting elements being attachable and detachable to the connector on the opposed tapered blades.

9. The tree transplanter of claim 8 in which the connectors arc lifting eyes, and the flexible connecting elements terminate in hooks.

10. The tree transplanter of claim 9 in which each tapered blade has a wide end and a narrow end and first and second sides and:

each tapered blade of the second pair of opposed tapered blades has a slot on each of the first and second sides at the wide end of the tapered blade, with the slots opening away from the narrow end, and an extension arm at the narrow end of the tapered blade, with the extension arm terminating in a pin; and each tapered blade of the first pair of opposed tapered blades has a slot at the narrow end of the tapered blade for receiving pins of adjacent tapered blades of the second pair of opposed tapered blades, and an extension arm on each of the first and second sides at the wide end of the tapered blade, with each extension arm terminating in a pin received, in operation, by a slot of an adjacent tapered blade of the second pair of opposed tapered blades.

11. A tree transplanter, comprising:

first and second pairs of opposed tapered blades loosely connected sequentially side by side to form a cone having a narrow end and a wide end;

the first pair of opposed tapered blades being removable from the second pair of opposed tapered blades by movement in the direction from the narrow end towards the wide end of the cone and being supported by the second pair of opposed tapered blades against movement from the wide end to the narrow end of the cone;

a connector on each of the tapered blades at the wide end of the cone for connection to a lifting apparatus;

each tapered blade having a wide end and a narrow end and first and second sides;

each tapered blade of the second pair of opposed tapered blades having a slot of each of the first and second sides at the wide end of the tapered blade, with the slots opening away from the narrow end, and an extension arm at the narrow end of the tapered blade, with the extension arm terminating in a pin; and each tapered blade of the first pair of opposed tapered blades having a slot at the narrow end of the tapered blade for receiving pins of adjacent tapered blades of the second pair of opposed tapered blades, and an extension arm on each of the first and second sides at the wide end of the tapered blade, with each extension arm terminating in a pin received, in operation, by a slot of an adjacent tapered blade of the second pair of opposed tapered blades.

* * * * *